June 14, 1932.  A. POWELL  1,863,125
FISH LURE
Filed Dec. 2, 1930
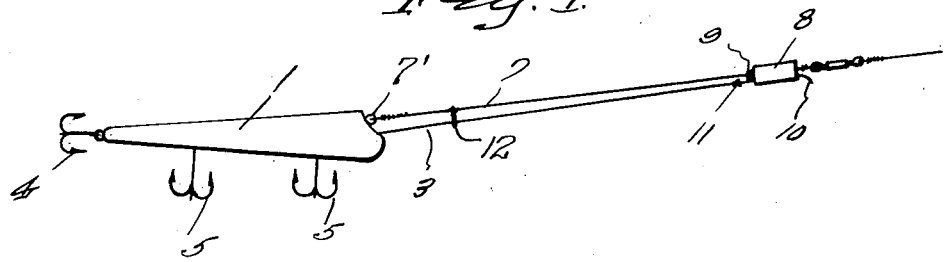
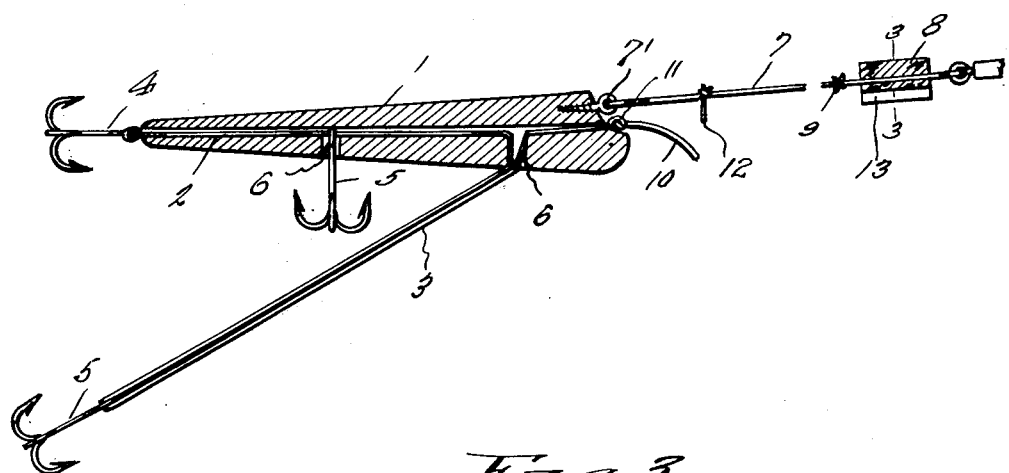
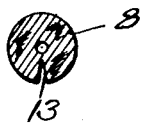
Inventor
Alvin Powell
By Clarence A O'Brien
Attorney Patented June 14, 1932

1,863,125

UNITED STATES PATENT OFFICE

ALVIN POWELL, OF CUTHBERT, GEORGIA

FISH LURE

Application filed December 2, 1930. Serial No. 499,579.

This invention relates to certain new and useful improvements in fish lures, and the primary object of the invention is to provide a fish lure including a body of suitable shape as to simulate a minnow or the like and equipped with one or more hooks together with means for maintaining the hook or hooks associated with the body and capable of movement relative to the body when the hook becomes engaged with a fish thus permitting the snared fish sufficient play as will only result in the fish becoming more thoroughly ensnared on the line.

The object and advantages of the invention together with the nature of the invention will become more apparent from a study of the following description, taken in connection with the accompanying drawing wherein:

Figure 1 is an elevational view of the invention, the same being shown as applied to the end of a fish line.

Figure 2 is a view partly in section and partly in elevation showing the position of the hook subsequent to a fish being ensnared on one of the hooks.

Figure 3 is a transverse sectional view taken substantially on line 3—3 of Figure 2.

With reference more in detail to the drawing, it will be seen that the fish lure includes a body 1 formed of suitable material and shaped so as to simulate a minnow. The body 1 is provided with a longitudinally extending bore 2 and an elongated length of string or other suitable flexible material 3 is passed through the bore. Suitably secured to one end of the string 3 is a hook 4 of conventional construction. The string 3 passing through the bore 2 also passes through the eyes of a pair of hooks 5—5 the shanks of which are accommodated in lateral openings 6 provided therefor in the body 1.

A conventional type of fish line may be used, and an end portion 7 thereof is suitably secured as at 7' to that end of the body 1 remote from the hook 4. Suitably arranged on said end portion 7 of the fish line is a cork 8. The cork 8 is limited in its movement toward the body 1 relative to the end of the fish line through the medium of a knot 9 provided in the end 7 of the fish line in advance of the cork 8. The string 3 is normally maintained in a taut or stretched condition by having the free end 10 of the member 3 engaged within a substantially V-shaped notch 13 opening at opposite ends of the cork and laterally of the cork as suggested in Figure 3. Adjacent said end 10 the string 3 is provided with a stop knot 11 adapted to engage the corresponding end of the body 1 when sufficient pull as applied by the fish ensnared on one of the hooks 4 or 5 is so exerted upon the member 3 as to draw the end 10 out of the notch 13. Thus the fish will be able to pull that particular hook upon which he is ensnared away from the body 1 without entirely withdrawing the member 3 through the core 2.

Manifestly then, the fish so ensnared on the hook and permitted such free play, will be unable to crush the particular hook against the body 1 for the purpose of shaking himself free of the hook as is often the case where the hook is connected directly to the body as is now the common practice of securing hooks to the body of a fish lure.

The knot 9 will act on the cork 8 oppositely to the pull exerted by the fish on the member 3 insuring the freeing of the end 10 from the notch 13 without danger of breaking the member 3.

Further, it will be apparent, that a fish ensnared on one of the hooks will in no wise interfere with a second fish becoming ensnared on a second hook so that on the one lure a number of fish may be caught according to the number of hooks engaged with the number 3.

I have also found it advisable, in actual practice, to provide on the end 7 of the fish line a guide ring 12 through which passes a portion of the member 3 when the latter is in a taut or fully stretched position (see Figure 1).

It is thought from the foregoing description, taken in connection with the accompanying drawing that a clear understanding of the operation, construction, utility and advantages of an invention of this character may be had by those skilled in the art without a more detail description.

Having thus described my invention, what I claim as new is:

1. A fish lure comprising in combination an elongated body provided with a longitudinally extending bore of relatively small diameter, said body being also provided with lateral openings spaced longitudinally relative to the body, a flexible member having a single length extending through said bore, a hook secured to one end of said flexible member, a hook having a shank extending into said bore through one of said lateral openings, and having an eye slidable on the intermediate portion of said flexible member, said flexible member at its free end provided with means for limiting movement of the flexible member through said bore in one direction, when a pull is exerted thereon by a fish ensnared on one or more of said hooks.

2. In combination, a fish line, a lure including a body secured to said line, an elongated flexible member engaged with said body for movement relative to said body, a hook engaged with said member for limiting movement of said member in one direction relative to said body, said member and said fish line remote from said body provided with cooperating means for normally retaining said flexible member extended for substantially its full length, said means being releasable when a pull is exerted on said flexible member.

In testimony whereof I affix my signature.

ALVIN POWELL.